US010851270B2

(12) United States Patent
Ingratta et al.

(10) Patent No.: US 10,851,270 B2
(45) Date of Patent: Dec. 1, 2020

(54) ADHESIVES COMPRISING POLYINDANE RESINS

(71) Applicant: Eastman Chemical Company, Kingsport, TN (US)

(72) Inventors: Mark William Ingratta, Copley, OH (US); Soumendra Kumar Basu, Copley, OH (US); Mark Stanley Pavlin, Kingsport, TN (US); Joseph Alexander Deloach, Jonesborough, TN (US); George Joseph Kutsek, South Park, PA (US); Wei Min Cheng, Pittsburgh, PA (US); Terri Roxanne Carvagno, Church Hill, TN (US); Christopher Lee Lester, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 15/845,222

(22) Filed: Dec. 18, 2017

(65) Prior Publication Data
US 2018/0171189 A1 Jun. 21, 2018

Related U.S. Application Data

(60) Provisional application No. 62/436,106, filed on Dec. 19, 2016.

(51) Int. Cl.
*C09J 125/08* (2006.01)
*C08L 53/00* (2006.01)
*C08F 12/34* (2006.01)
*C09J 125/16* (2006.01)
*C09J 165/00* (2006.01)

(52) U.S. Cl.
CPC .............. *C09J 125/08* (2013.01); *C08F 12/34* (2013.01); *C08L 53/00* (2013.01); *C09J 125/16* (2013.01); *C08G 2261/342* (2013.01); *C08G 2261/3424* (2013.01); *C08G 2261/60* (2013.01); *C08L 2207/04* (2013.01); *C09J 165/00* (2013.01)

(58) Field of Classification Search
CPC ...... C09J 125/08; C08L 2207/04; C08L 53/00
USPC ........................................................ 524/577
See application file for complete search history.

(56) References Cited

U.S. PATENT DOCUMENTS

| 3,567,786 | A | 3/1971 | Bostian et al. |
| 4,205,160 | A | 5/1980 | Gloth et al. |
| 4,403,088 | A | 9/1983 | Smith et al. |
| 4,499,248 | A | 2/1985 | Jalics |
| 4,528,413 | A | 7/1985 | Colvin et al. |
| 4,537,930 | A | 8/1985 | Bussink et al. |
| 5,049,615 | A | 9/1991 | Chu et al. |
| 5,350,604 | A * | 9/1994 | Crivello ................. C08F 12/34 427/240 |
| 5,684,091 | A | 11/1997 | Maly et al. |
| 5,985,963 | A | 11/1999 | D'Sidocky et al. |
| 6,153,721 | A | 11/2000 | McCarthy et al. |
| 6,184,285 | B1 | 2/2001 | Hatfield et al. |
| 6,310,154 | B1 | 10/2001 | Babcock et al. |
| 6,346,296 | B1 | 2/2002 | McCarthy et al. |
| 6,465,557 | B1 | 10/2002 | De Keyzer et al. |
| 6,492,436 | B2 | 12/2002 | Howe et al. |
| 6,657,000 | B1 | 12/2003 | De Keyzer et al. |
| 7,402,646 | B2 | 7/2008 | Ittel et al. |
| 2003/0069384 | A1 | 4/2003 | McCarthy et al. |
| 2003/0153680 | A1 | 8/2003 | McBride et al. |
| 2008/0096787 | A1 | 4/2008 | Cauley et al. |
| 2011/0067799 | A1 | 3/2011 | Mussig et al. |
| 2014/0228519 | A1 | 8/2014 | Nakayama et al. |
| 2016/0159147 | A1 | 6/2016 | Isitman et al. |
| 2016/0304756 | A1 * | 10/2016 | Lipi Shan .............. C09J 157/00 |
| 2016/0339743 | A1 | 11/2016 | Abad et al. |

FOREIGN PATENT DOCUMENTS

| CA | 751995 | A | | 1/1967 | |
| CN | 101979255 | A | | 2/2011 | |
| CN | 103435872 | A | | 12/2013 | |
| EP | 0432696 | B1 | * | 8/1997 | .............. C08L 53/02 |
| EP | 0432696 | B1 | | 8/1997 | |
| GB | 850363 | | | 10/1960 | |
| GB | 850363 | A | * | 10/1960 | .............. C08F 10/00 |

OTHER PUBLICATIONS

Notification of Transmittal of the International Search Report and the Written Opinion of the International Searching Authority, or the Declaration International Application No. PCT/US17/67220 dated Mar. 8, 2018.
Notification of Transmittal of the International Search Report and the Written Opinion of the International Searching Authority, or the Declaration International Application No. PCT/US17/67209 dated Mar. 8, 2018.
H. Brunner, et al.; "The Preparation and Structure of Linear Polymers from Di-isopropenylbenzenes"; Journal of Polymer Science, vol. 28, Issue No. 118, 1958, pp. 629-631.
ASTMD1646; Standard Test Methods for Rubber—Viscosity, Stress Relaxation, and Pre-Vulcanization Characteristics (Mooney Viscometer); Published Jan. 2018.

(Continued)

*Primary Examiner* — Hui H Chin
(74) *Attorney, Agent, or Firm* — Polly C. Owen

(57) ABSTRACT

The present invention is generally related to various types of compositions that comprise a polyindane resin. In particular, the polyindane resins may be utilized in various polymer-based and elastomer-based formulations in order to enhance several properties and characteristics of those formulations. More specifically, adhesive formulations are provided that comprise at least one polyindane resin, which may be used to replace or enhance the functionality of existing hydrocarbon resins typically used in adhesive formulations. Compositions comprising at least one thermoplastic elastomer and at least one polyindane resin are also provided.

20 Claims, 2 Drawing Sheets

(56) References Cited

OTHER PUBLICATIONS

ASTMD6601; "Standard Test Method for Rubber Properties—Measurement of Cure and After-Cure Dynamic Properties Using a Rotorless Shear Rheometer"; Published Dec. 2015.
ASTMD5289; "Standard Test Method for Rubber Property—Vulcanization Using Rotorless Cure Meters" Published Nov. 2017.
ASTMD2240; "Standard Test Method for Rubber Property—Durometer Hardness"; Published Jan. 2016.
ASTMD412; "Standard Test Methods for Vulcanized Rubber and Thermoplastic Elastomers Tension"; Published Dec. 2016.
ASTMD624; "Standard Test Method for Tear Strength of Conventional Vulcanized Rubber and Thermoplastic Elastomers"; Published Mar. 2012.
ASTMD5963; Standard Test Method for Rubber Property—Abrasion Resistance (Rotary Drum Abrader); Published Sep. 2015.
Mitin, Yu. V., et al..; "The Polymerization of Some Compounds Containing Two Isopropenyl Groups"; Doklady Akademii Nauk SSSR, (1957), 115, 97, pp. 671-674.
Lutz, Pierre et al.; "Anionic Polymerization and Copolymerization of 1,3- and 1,4-Diisopropenylbenzene"; Makromol. Chem. 183, (1982), pp. 2787-2797.
ASTMD3236; "Standard Test Method for Apparent Viscosity of Hot Melt Adhesives and Coating Materials"; Published May 2015.
ASTMD6493; "Standard Test Methods for Softening Point of Hydrocarbon Resins and Rosin Based Resins by Automated Ring-and-Ball Apparatus"; Published Dec. 2015.
ASTMD638; "Standard Test Method for Tensile Properties of Plastics"; Published Mar. 2015.
ATSMD395-14; "Standard Test Methods for Rubber Property—Compression Set"; Published Aug. 2014.
New co-pending U.S. Appl. No. 15/845,182, filed Dec. 18, 2017.
Non-Final Office Action dated Mar. 29, 2019 received in U.S. Appl. No. 15/845,182.
Final Office Action dated Jan. 6, 2020 received in U.S. Appl. No. 15/845,182.
Non-Final Office Action dated Jun. 11, 2020 received in U.S. Appl. No. 15/845,182.

* cited by examiner

Where  A = aromatic moiety
       I = isopropyl group
       U = isopropenyl group

ADHESIVES COMPRISING POLYINDANE RESINS

RELATED APPLICATIONS

This application claims priority to U.S. Provisional Patent Applications Nos. 62/436,106 filed on Dec. 19, 2016, which is incorporated herein by reference.

BACKGROUND

1. Field of the Invention

The present invention is generally related to adhesive compositions. More particularly, the present invention is generally related to adhesive compositions comprising a performance-enhancing hydrocarbon resin.

2. Description of the Related Art

A variety of commercially-available hydrocarbon resins exist that are useful for formulating adhesives and for modifying thermoplastic elastomeric polymers that constitute the major component of automotive vehicle tires and many other useful products. There is, however, an ongoing need to improve the performance of these various products. One way to enhance performance is to modify the base elastomer with hydrocarbon resins having superior properties, especially resins with low molecular weights, high glass transition temperatures, excellent oxidative and thermal stabilities, low color, and low odor. These hydrocarbon resins generally are the products of the polymerization of various olefins and mixtures of olefins made available by the chemical industry. For example, many of these resins, such as $C_5$ and $C_9$ resin oil, may be byproducts of crude oil refining, in particular the byproducts produced during the cracking of naphtha. However, due to the rapid conversion rate of crackers, these byproducts are now in severely restricted supply and the problem of $C_5$ and $C_9$ resin oil availability is likely chronic. Thus, it is also important that these new performance resins be derived from cost-effective starting materials available in adequate quantity for the foreseeable future, such as commodity aromatic and olefinic feedstocks including, for example, benzene, toluene, ethylene, propylene, and the like.

SUMMARY

One or more embodiments of the present application concern an adhesive comprising at least one polyindane resin.

One or more embodiments of the present application concern an adhesive comprising at least one polymer, a polyindane resin, and at least one tackifying resin, wherein the adhesive exhibits a viscosity at 177° C. in the range of 50 to 10,000 cP and a softening point in the range of 60 to 180° C.

One or more embodiments of the present application concern a method for forming an adhesive. Generally, the method involves blending a polyindane resin and an elastomer to form the adhesive.

One or more embodiments of the present application concern a composition comprising at least one thermoplastic elastomer and at least one polyindane resin. More specifically, a composition comprising at least one polyindane resin and at least one thermoplastic elastomer selected from the group consisting of styrenic block copolymers including, but not limited to, styrene-butadiene-styrene block copolymers (SBS), styrene-ethylene-butadiene-styrene block copolymers (SEBS), styrene-ethylene-ethylene-styrene block copolymer (SEEPS), and styrene-isoprene-styrene (SIS).

BRIEF DESCRIPTION OF THE FIGURES

Embodiments of the present invention are described herein with reference to the following drawing figures, wherein.

DETAILED DESCRIPTION

As discussed below in further detail, the present invention is generally related to adhesive compositions comprising at least one polyindane resin.

In particular, the polyindane resins of the present invention are especially suited for use in adhesive formulations due to their favorable balance of aliphatic and aromatic properties, which provide good compatibility with different elastomer blends. The unique backbone results in a rigid main chain structure that imparts a high glass transition temperature to the elastomer blends. In cases where the compatibility of a hydrocarbon resin with the elastomers benefits from having a high aliphatic character, the polyindane resins can be partially or even fully hydrogenated.

Figure 1:
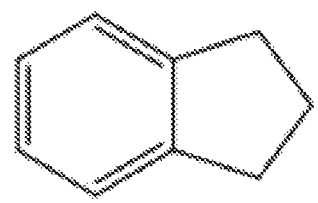
FIG. 1 depicts the chemical structure of indane.
Figure 2:
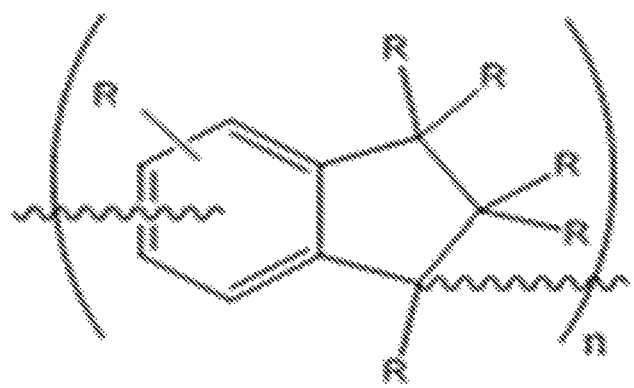
FIG. 2 depicts the general structure of a polyindane polymer.
Figure 3:
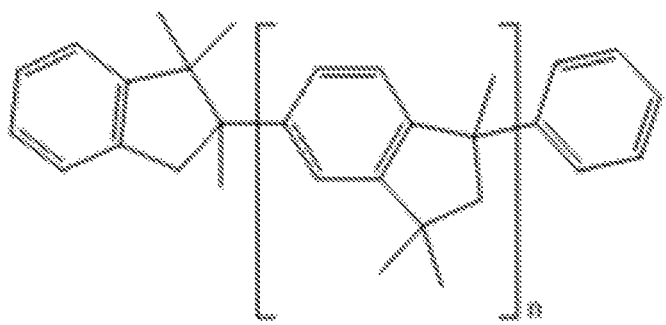
FIG. 3 depicts a polymer structure resulting from the reaction of 1,3-diisopropenylbenzene and a minor portion of AMS.

FIG. 1 shows the chemical structure of indane, the parent compound of the polyindane resins of the present invention. The term "indane," as used herein, is a common shorthand for the compound depicted in FIG. 1, which has a five-membered aliphatic ring fused to a six-membered aromatic ring. Indane has a chemical formula of $C_9H_{10}$ and its IUPAC name is "2,3-dihydro-1H-indene." As used herein, a "polyindane" refers to any polymer that contains indane rings as the primary chain component, which are linked to one another via single bonds that connect a carbon atom of the five-membered aliphatic ring to a carbon atom of the six-membered aromatic ring. FIG. 2 depicts the general structure of a polyindane polymer, wherein "R" is hydrogen, alkyl, or aryl. In various embodiments, "R" is preferably, but not restricted to, either hydrogen or a methyl group. FIG. 3 depicts a specific example of a polyindane polymer.

Generally, the molecular weight ("MW"), aromaticity ("AR"), and glass transition temperature ("$T_g$") are some of the most important properties of the polyindane resins.

In various embodiments, the polyindane resins may have $T_g$ values of at least 10, 20, 30, 40, 45, or 50° C. and/or not more than 150, 130, 120, 110, 100, or 90° C. For instance, the polyindanes can have $T_g$ values in the range of 10 to 150° C., 40 to 130° C. or 50 to 90° C. The $T_g$ is measured using differential scanning calorimetry ("DSC"), but can be approximated by correlation with the ring-and-ball softening point of the polyindane resin, which is generally higher by about 45 to 50° C.

In various embodiments, the polyindane resins can exhibit a ring and ball softening point of at least 40, 50, 60, 70, 80, 90, or 100° C. and/or not more than 170, 160, 150, or 140° C. For example, the polyindane resins may exhibit a ring and ball softening point in the range of 40 to 200° C., 70 to 170° C., or 100 to 140° C.

In various embodiments, the polyindane resins may comprise a number average molecular weight ("$M_n$") in the range of about 300 to 3,000 g/mol or 400 to 1,000 g/mol. In other embodiments, the polyindane resins may comprise a weight average molecular weight ("$M_w$") in the range of 100 to 5,000 g/mol, 300 to 4,000 g/mol, or 500 to 2,000 g/mol. In yet other embodiments, the polyindane resins may comprise a z-average molecular weight ("$M_z$") in the range of 200 to 5,000 g/mol, 400 to 4,000 g/mol, or 1,000 to 3,000 g/mol. In still yet other embodiments, the polyindane resins may comprise a polydispersity ("$M_w/M_n$") in the range of 1.1 to 1.8, 1.2 to 1.7, or 1.3 to 1.6. The molecular weights are measured using gel permeation chromatography ("GPC") against polystyrene standards.

The aromaticity of the polyindane resins can be measured by integrating the area of the aromatic proton region of the nuclear magnetic resonance ("NMR") spectrum of the resin or by the "mixed methylcyclohexane cloud point" temperature ("MMAP") of the resin, where a lower MMAP value indicates higher aromaticity. The MMAP of the polyindane resins may vary depending on the degree of hydrogenation. For instance, polyindane resins that have not been subjected to hydrogenation may exhibit a MMAP cloud point in the range of 0 to 50° C. In various embodiments, the polyindane resins can exhibit a mixed methylcyclohexane cloud point temperature (MMAP) of at least −20° C. and not more than 100° C.

In various embodiments, the polyindane resins can be partially or fully hydrogenated.

As discussed further below, the polyindane resins of the present invention may be produced from cost-effective starting materials. For example, treatment of a polyisopropenyl-substituted aromatic compound with an acid catalyst can provide a hydrocarbon solvent-soluble oligomer with indane chain units having both a high softening point and a low molecular weight. These amorphous solids ("resins") are suitable for use with common elastomers and oil, especially those elastomers that serve as the base component of adhesives, sealants, and the like. In various embodiments, polyisopropenyl-substituted aromatic compounds may be advantageously co-reacted with mono-isopropenyl-substituted aromatic compounds, including alpha-methylstyrene and other mono-olefins, such as styrene, to adjust the molecular weight and softening point of the resulting polyindanes. Hydrocarbon resins prepared in this manner may be compatible with common styrene-based elastomers and may be partially or fully hydrogenated to provide resins that have good compatibility with polyethylene-based and polypropylene-based olefin copolymer elastomers.

Adhesive Formulations

As discussed above, various adhesive formulations are disclosed herein that can comprise at least one polyindane resin. In various embodiments, the adhesive compositions can comprise at least 1, 2, 3, 4, 5, 10, 15, 20, 25, 30, 35, 40, 45, 50, 55, or 60 and/or not more than 99, 95, 90, 85, 80, 75, 70, or 65 weight percent of at least one polyindane resin.

In particular, the polyindane resins can be used to produce various types of adhesives including, but not limited to, hot melt or solvent based pressure sensitive adhesives (e.g., tape, labels, mastics, HVACs, etc.), hot melt nonwoven adhesives (e.g., construction, elastic attachment, or stretch), and hot melt packaging adhesives. Furthermore, the polyindane resins can also be used to modify different polymer systems in order to improve processability, stability, thermal properties, viscoelasticity, rheology, and/or adhesion and mechanical properties of the systems. Moreover, the polyindane resins can be used to enhance various properties in thermoplastic elastomer applications, roofing applications, sealant applications, cable flooding/filling applications, and tire elastomer applications (e.g., tread, side wall, inner liners, inner-tube, etc.).

In various embodiments, the adhesive compositions comprise at least one polymer/elastomer component. Preferred elastomer components of the adhesive compositions of the present invention include, without limitation, ethylene vinyl acetate copolymer, ethylene n-butyl acrylate copolymer, ethylene methyl acrylate copolymer, polyester, neoprene, urethane, poly(acrylate), ethylene acrylic acid copolymer, polyether ether ketone, polyamide, styrenic block copolymers, random styrenic copolymers, hydrogenated styrenic block copolymers, styrene butadiene copolymers, natural rubber, polyisoprene, polyisobutylene, atactic polypropylene, polyethylene, ethylene-propylene polymers, ethylene-butene polymers, ethylene octene polymers, propylene-butene polymers, propylene-octene polymers, ethylene-propylene-butylene terpolymers, functional polymers such as maleated polyolefins, butyl rubber, polyester copolymers, copolyester polymers, isoprene, the terpolymer formed from the monomers ethylene, propylene, and a bicyclic olefin (known as "EPDM"), isoprene-based block copolymers, butadiene-based block copolymers, ethylene vinyl acetate copolymer, acrylate copolymers such as ethylene acrylic acid copolymer, butadiene acrylonitrile rubber, and/or polyvinyl acetate.

Typically, the adhesive composition can contain significant amounts of elastomer, tackifier resin, and other additives like oils, waxes, plasticizers, antioxidants and fillers, depending on the end use application. In various embodiments, the adhesives can comprise at least 5, 10, 15, 20, 25, 30, 35, 40, 45, or 50 and/or not more than 500, 450, 400, 350, or 300 parts of elastomer, tackifier resin, and/or other additives per 100 parts of polyindane resin. For example, the adhesive composition may contain 50 to 300 parts of elastomer per 100 parts of polyindane resin.

In various embodiments, the adhesive compositions may additionally contain additives that render the composition particularly suitable for a particular application. The use of many such additives is well known in the art, and they may be used for their intended purpose in the adhesive compositions of the present invention. For example, if the adhesive is intended to serve as a hot melt packaging adhesive, then a wax is a useful additional ingredient. Suitable waxes include, without limitation, microcrystalline wax, paraffin wax, waxes produced by Fischer-Tropsch processes, vegetable wax and the like. Normally, a wax will be included in the composition in an amount of between 40 and 100 parts wax per 100 parts of the elastomer component.

If the adhesive is intended to be used as a pressure sensitive adhesive (e.g., tapes and labels) and nonwoven adhesive applications, then oil may be a useful additive. Suitable oils include naphthenic oil, paraffinic oils, aromatic oils, mineral oils, triglyceride oils, and the like. Furthermore, one or more plasticizers may be added to the adhesive composition, where suitable plasticizers include, without limitation, phthalate esters such as dibutyl phthalate and dioctyl phthalate, benzoates, terephthalates, and chlorinated paraffins. Moreover, one or more fillers, such as carbon black, calcium carbonate, titanium oxide and zinc oxide, may be incorporated into the adhesive compositions. In addition, extender oils may also be present in the adhesive composition, where exemplary extender oils include, without limitation, liquid paraffin, castor oil, rape seed oil, mineral oil, and the like.

Other tackier resins may be present in the adhesive compositions, sometimes in the form of physical blends. These other tackifier resins that may be added to the adhesive compositions include, without limitation, cycloaliphatic hydrocarbon resins, $C_5$ hydrocarbon resins, $C_5/C_9$ hydrocarbon resins, aromatically modified $C_5$ resins, $C_9$ hydrocarbon resins, pure monomer resins (e.g., copolymers of styrene with alpha-methyl styrene, vinyl toluene, para-methyl styrene, indene, and methyl indene), DCPD resins, dicyclopentadiene based/containing resins, cyclo-pentadiene based/containing resins, terpene resins, terpene phenolic resins, terpene styrene resins, esters of rosin, esters of modified rosins, liquid resins of fully or partially hydrogenated rosins, fully or partially hydrogenated rosin esters, fully or partially hydrogenated modified rosins resins, fully or partially rosin alcohols, fully or partially hydrogenated $C_5$ resins, fully or partially hydrogenated $C_5/C_9$ resins, fully or partially hydrogenated DCPD resins, fully or partially hydrogenated dicyclopentadiene based/containing resins, fully or partially hydrogenated cyclo-pentadiene based/containing resins, fully or partially hydrogenated aromatically modified $C_5$ resins, fully or partially hydrogenated $C_9$ resins, fully or partially hydrogenated pure monomer resins (e.g., copolymers or styrene with alpha-methyl styrene, vinyl toluene, para-methyl styrene, indene, and methyl indene), fully or partially hydrogenated $C_5$/cycloaliphatic resins, fully or partially hydrogenated $C_5$/cycloaliphatic/styrene/$C_9$ resins, fully or partially hydrogenated cycloaliphatic resins, and mixtures thereof.

In various embodiments, the adhesive compositions of the present invention may include, in addition to the elastomer and one or more polyindane resins, an additive selected from wax, process oil, cycloaliphatic hydrocarbon resins, $C_5$ hydrocarbon resins, $C_5/C_9$ hydrocarbon resins, aromatically modified $C_5$ resins, $C_9$ hydrocarbon resins, pure monomer resins (e.g., copolymers of styrene with alpha-methyl styrene, vinyl toluene, para-methyl styrene, indene, and methyl indene), DCPD resins, dicyclopentadiene based/containing resins, cyclo-pentadiene based/containing resins, terpene resins, terpene phenolic resins, terpene styrene resins, esters of rosin, esters of modified rosins, liquid resins of fully or partially hydrogenated rosins, fully or partially hydrogenated rosin esters, fully or partially hydrogenated modified rosins resins, fully or partially rosin alcohols, fully or partially hydrogenated $C_5$ resins, fully or partially hydrogenated $C_5/C_9$ resins, fully or partially hydrogenated DCPD resins, fully or partially hydrogenated dicyclopentadiene based/containing resins, fully or partially hydrogenated cyclo-pentadiene based/containing resins, fully or partially hydrogenated aromatically modified $C_5$ resins, fully or partially hydrogenated $C_9$ resins, fully or partially hydrogenated pure monomer resins (e.g., copolymers or styrene with alpha-methyl styrene, vinyl toluene, para-methyl styrene, indene, and methyl indene), fully or partially hydrogenated $C_5$/cycloaliphatic resins, fully or partially hydrogenated $C_5$/cycloaliphatic/styrene/$C_9$ resins, fully or partially hydrogenated cycloaliphatic resins, and combinations thereof. In one or more embodiments, the adhesive compositions may comprise at least 5, 10, 15, 20, 25, 30, 35, 40, 45, or 50 and/or not more than 500, 450, 400, 350, or 300 parts of one or more additives per 100 parts of elastomer.

The adhesive composition of the present invention may be prepared from the polyindane resin, the elastomer, and the additives using conventional techniques and equipment. For example, the components of the adhesive composition may be blended in a mixer such as a Sigma blade mixer, a plasticorder, a brabender mixer, a twin screw extruder, and/or an incan blend can (pint-cans). Furthermore, the adhesive composition may be shaped into a desired form, such as a tape or sheet, by an appropriate technique including extrusion, compression molding, calendaring, or roll coating techniques (gravure, reverse roll, etc.). Alternatively, the adhesive may be applied using curtain coating, slot-die coating, or sprayed through different nozzle configurations at different speeds using typical application equipment.

The adhesive composition may be applied to a substrate by melting the composition and then using conventional hot melt adhesive application equipment recognized in the art. Suitable substrates include textile, fabric, paper, glass, plastic, and metal. Typically, about 0.1 to 100 $g/m^2$ of adhesive composition is applied to a substrate. The adhesive composition may be useful as a hot melt adhesive for those applications where hot melt adhesives are currently employed. Due to the use of the polyindane resin of the present invention, the melting point and/or ring and ball softening point of the tackifier resin can be selected to suit the intended end use for the adhesive composition.

In various embodiments, the adhesive compositions may exhibit a viscosity at 177° C. in the range of 50 to 10,000 cP. In other embodiments, the adhesive compositions may exhibit a ring and ball softening point in the range of 60 to 180° C.

Modification of Thermoplastic Elastomers by Polyindane Resins

Polyindane resins can be used to modify thermoplastic elastomers. A composition is provided comprising at least one thermoplastic elastomer and at least one polyindane resin. "Thermoplastic elastomers" (TPEs) are defined as low modulus, flexible materials that can be stretched repeatedly to at least twice their original length at room temperature with an ability to return to their approximate original length when stress is released. The grandfather materials with this property are thermoset rubbers, but many families of injection-moldable thermoplastic elastomers (TPEs) are replacing traditional rubbers. In addition to use in their basic form, TPEs are widely used to modify the properties of rigid thermoplastics, usually improving impact strength. This is quite common for sheet goods and general molding TPEs.

Any TPE known in the art can be utilized in this invention. In one embodiment, TPEs can be selected from the group consisting of block copolymers; thermoplastic/elastomer blends and alloys; metallocene-catalyzed polyolefin plastomers and elastomers; and reactor-made thermoplastic polyolefin elastomers. Block copolymers can include, but are not limited to, styrenic block copolymers, copolyester block copolymers, polyurethane block copolymers and polyamide block copolymers. Thermoplastic/elastomer blends and alloys can include, but are not limited to, thermoplastic polyolefins and thermoplastic vulcanizates.

Traditional TPE types, the block copolymers and thermoplastic/elastomer blends and alloys, are known as two-phase systems. Essentially, a hard thermoplastic phase is coupled mechanically or chemically with a soft elastomer phase, resulting in a TPE that has the combined properties of the two phases.

Styrenic block copolymers (TPE-S) are based on a two-phase block copolymer with hard and soft segments. Examples of styrenic block copolymers include, but are not limited to, styrene-butadiene-styrene block copolymers (SBS), styrene-ethylene/butylene-styrene block copolymers (SEBS), styrene-[ethylene-(ethylene/propylene-)]styrene block copolymers (SEEPS), styrene-isoprene-styrene block copolymer (SIS). For SBS, the styrene end blocks provide the thermoplastic properties and the butylene mid-blocks provide the elastomeric properties. Styrene-butadiene-styrene block copolymer (SBS) is probably the highest volume TPE-S material. It is commonly used in footwear, adhesives, bitumen modification, and lower specification seals and grips where resistance to chemicals and aging is a lower priority. SBS, when hydrogenated, becomes SEBS (styrene-ethylene-butadiene-styrene block copolymer), as the elimination of C=C bonds in the butadiene component generates ethylene and butylene mid-block, hence the SEBS acronym. SEBS is characterized by improved heat resistance, mechanical properties, and chemical resistance. Monoprene®, Tekron®, and Elexar® products from Teknor Apex are examples of hydrogenated styrenic block copolymers. Styrene-[ethylene-(ethylene/propylene)]-styrene (SEEPS) polymer is supplied by Septon Company, and styrene-ethylene-butylene-styrene (SEBS) block copolymer can be obtained from Kraton Polymers LLC as KRATON® G1651, with polystyrene end blocks, each with molecular weight of 29,000 and an ethylene/butylene midblock with a molecular weight of 116,000.

Polymer modification applications for polyindane modified thermoplastic elastomers can include, but are not limited to, roofing applications (especially asphalt modifiers in modified bitumen roofing), water proofing membranes/compounds, underlayments, cable flooding/filling compounds, caulks and sealants, polymer compounds/blends, films (e.g., cling films, TPE films, etc.), molded articles, rubber additive/processing aids, carpet backing (e.g., high performance precoat, thermoplastic compound, etc.), wire and cables, power and hand tools, pen grips, airbag covers, grips and handles, seals, and laminated articles (e.g., paper lamination, water activated, hot melt gummed, scrim reinforced tape, etc.). When used in these various applications, the polyindane can be the sole resin in the formulation or may be used in combination with other elastomers/polymers and/or additives. In such applications, the aforementioned compositions comprise at least 1, 2, 3, 4, 5, 10, 15, 20, 25, 30, 35, 40, 45, 50, 55, or 60 and/or not more than 99, 95, 90, 85, 80, 75, 70, or 65 weight percent of at least one polyindane resin.

The polyindane resins of the present invention do not show large changes in color when subjected to storage conditions at elevated temperature over extended periods of time. The polyindane resins of the present invention also exhibit good viscosity stability and so adhesives and articles made therefrom will also typically have good viscosity stability with little or no skinning (e.g., after heat aging at 177° C. for 72-96 hours or longer).

Preparation of the Polyindane Resins

Figure 4:
FIG. 4 depicts a process scheme for the manufacture of the indane resin monomer feedstock.

In various embodiments, the instant polyindanes are the product of the oligomerization of polyisopropenyl-substituted aromatic compounds. Production of a polyisopropenyl aromatic feedstock suitable for conversion to a polyindane resin can be done via the two-stage process outlined in FIG. 4, which generally comprises: (1) alkylation of an aromatic feedstock (A) and propylene (P) to one or more isopropyl-substituted aromatic compounds ($Al_n$), wherein n is an integer from 2-6; and (2) dehydrogenation or oxidation of $Al_n$ to an indane resin process monomer comprising or consisting essentially of one or more polyisopropenyl aromatic compounds ($AU_n$).

Generally, the most preferred starting compounds (A) include those that have favorable cost, availability, concentration of the most preferred components/isomers, ease of alkylation (highest yield, lowest process cost), ease of dehydrogenation (highest in yield of the preferred reactive monomer), and suitability for making a polyindane resin having the physical properties required for elastomer formulation.

For example, the aromatic feedstock (A) can be any commercially-available aromatic compounds derived from petroleum, such as benzene, toluene, ethylbenzene, and/or xylene. Depending on the ratio of reactants, alkylation of benzene, toluene, ethylbenzene, and xylene with propylene affords various mono-, di-, or triisopropyl-substituted aromatics. In each case, careful fractional distillation of the crude reaction product can produce the most preferred diisopropyl-substituted aromatic compound ($Al_n$) in good purity. In this manner, the addition of about two moles of propylene per mole of benzene, toluene, ethylbenzene, and/or xylene yields, respectively, diisopropyl benzene, diisopropyltoluene, diisopropylethylbenzene and diisopropylxylene.

Figure 5:
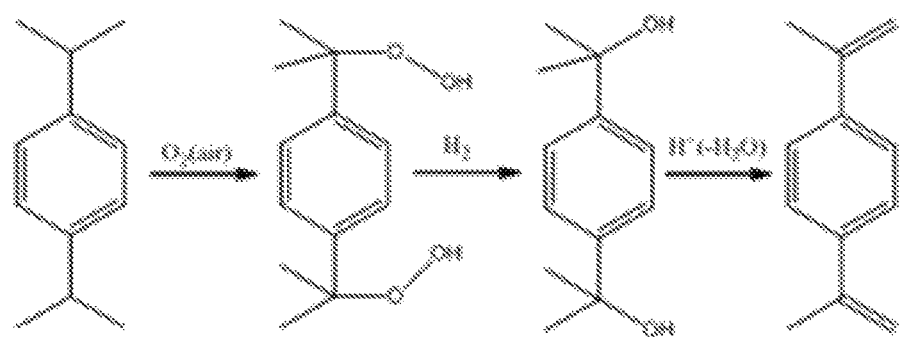
FIG. 5 depicts a schematic process for the oxidative conversion of para-diisopropylbenzene to para-diisopropenyl benzene.

Next, the intermediate aromatic compounds may be dehydrogenated to a mixture of the mono-isopropyl, mono-isopropenyl aromatic compound (AlU) and $Al_2$ over a cerium-promoted iron oxide catalyst. Conversion and selectivity of this process to the most preferred $AU_2$ compound varies depending on the starting aromatic compound and the positional isomer composition of the intermediate. Alternatively, the diisopropyl-substituted aromatic compounds $Al_2$ can be oxidized with air to the corresponding dihydroperoxides, reduced to the corresponding diols, and then dehydrated to the desired diisopropenyl-substituted aromatic compounds. FIG. 5 depicts the schematic process for the conversion of para-diisopropylbenzene to para-diisopropenylbenzene.

More specifically, the first step of the polyindane production process involves alkylation of an aromatic compound (A) with propylene to thereby yield one or more polyisopropyl-substituted aromatic compounds ($Al_n$). The aromatic compound (A) can be any aromatic hydrocarbon having at least two open (unsubstituted) ring positions, for example, benzene, naphthalene, or biphenyl. Preferably, the aromatic compound (A) comprises an aromatic hydrocarbon feedstock having a combination of low cost, good availability, highest yield and lowest process cost of propylation, and highest in yield of the preferred polymerizable monomer when subjected to dehydrogenation. Also important is that the monomer, when polymerized, yields a polymer having the properties required of its intended use. The most preferred aromatic compounds (A) comprise benzene, toluene, ethylbenzene, xylene, and/or naphthalene.

Depending on the ratio of reactants, propylation of benzene, toluene, ethylbenzene, xylene, and naphthalene can yield isomeric mono-, di-, tri-, or tetraisopropyl-substituted aromatic compounds (herein, the term "poly" refers to more than one of the designated substituent moieties). At very high aromatic/propylene ratios (A/P), the product can be a mono-isopropyl aromatic such as, for example, isopropylbenzene (cumene) from benzene, isopropyltoluene (cymene) from toluene, or dimethylisopropylbenzene (isomeric isopropylxylenes) from xylene.

At lower A/P ratios, di-alkylation is dominant. Addition of two moles of propylene per mole of, for example, benzene, toluene, and xylene affords, respectively, diisopropyl benzene, diisopropyltoluene, and diisopropylxylene. When propylene is present in excess, tri-propylation is possible and even higher levels of propylation are possible (e.g., tetra-propylation of naphthalene) and sometimes favored, especially at higher process temperatures and longer reaction times.

Technology for the alkylation of aromatics with olefins, such as propylene, is well-known in the chemical industry. For example, Friedel-Crafts alkylation of benzene with toluene using phosphoric acid or aluminum chloride catalysts has been used for many years in the production of cumene. The phosphoric acid may be liberated from a mixture of inorganic phosphates, optionally supported. Such processes may be used in the present invention. More recently, producers of cumene and other alkylated aromatics have increased the use of zeolite-based processes. Zeolite-based alkylation avoids corrosion and reduces environmental concerns associated with phosphoric acid and aluminum chloride. Also, zeolites can be regenerated.

Alkylation of aromatics with propylene can be performed in a batch or continuous process. Furthermore, alkylation may be performed either in the vapor phase or the liquid phase. Process equipment may include, but is not limited to, a multi-phase stirred tank reactor or a multi-phase fixed-bed reactor. Operating temperatures may range from 80 to 300° C. and pressures may range from 50 to 1000 psig.

The second step of the polyindane production process involves the dehydrogenation of the isopropylated aromatic compound $Al_n$ to thereby produce the polymerizable aromatic monomer $Al_{n-m}U_m$, where n is an integer from 2 to 6 and m is an integer from 2 to 6 such that m+1≤n and is comprised of one or more polyisopropenyl-substituted aromatic compounds (where n–m is >1), but which may also contain the mono-substituted species $Al_{n-m}U$. For example, cumene and cymene can be readily dehydrogenated in high conversion and high selectivity to alpha-methylstyrene or methyl alpha-methylstyrene, respectively, over a commercial cerium-promoted iron oxide catalyst. The oligomerization process (details below) can transform these mono-olefin compounds by themselves to dimers, but will not yield resins. These mono-olefin materials can be useful in the regulation of the molecular weight of the polyindane resins.

Examples of the conversion of $Al_2$ to $AU_2$ can include the dehydrogenation of diisopropyltoluene (mixture of isomers) to diisopropenyl-toluene (mixture of isomers), diisopropylethylbenzene to diisopropenylethylbenzene, and diisopropylnaphthalene to diisopropenyl-naphthalene. A similar dehydrogenation process converts triisopropylbenzene to triisopropenylbenzene in high yield along with the corresponding diolefin and the corresponding mono-olefin. In various embodiments, this process may convert only one, two, or m of the n isopropyl substituents of $Al_n$, affording respectively, the mono-olefins, $Al_{n-1}U$ or the diolefins $Al_{n-2}U_2$, or the tri-olefins $Al_{n-3}U_3$. In general, complete dehydrogenation of all the isopropyl groups of $Al_n$ is not usually practiced as it requires extreme process conditions resulting in numerous byproducts; however, complete dehydrogenation is not required since some amount of mono-olefin can be beneficial to the polymerization process in order to limit the molecular weight of the resulting polyindane resin.

The third step of the polyindane production process involves treating a monomer feedstock comprising or consisting of a compound of the generalized structure $Al_{n-m}U_m$, whether pure or as a mixture of variously unsaturated aromatic compounds of general structure $Al_{n-m}U_m$ with an acid catalyst in order to obtain the polyindane polymer. Generally, the attempted polymerization of a polyfunctional olefin monomer when catalyzed by free-radical initiators, anionic catalysts, and Lewis acids such as dry, uncomplexed boron trifluoride or aluminum chloride, leads to highly cross-linked materials. If carried out in solution, the result is an intractable solvent-swollen gel. The expected result of the application of conventional Lewis acid-mediated polymerization of $AU_n$ monomers when n>1 is, at least, a very high molecular weight material or, more probably, a cross-linked gel. In many cases, the course of the anionic and free-radical polymerization of diisopropenyl aromatic monomers can lead to cross-linking.

The course of cationic polymerization of polyisopropenyl-substituted aromatic compounds can be very different, leading to low molecular weight substances with bicyclic (indane) structures as chain units. The designation "polyindane" is, then, given to this type of polymer. Treatment of polyisopropenyl-substituted aromatic compounds under specific conditions with a cationic substance, most usefully a Bronsted acid, can initiate a process that results in the formation of a polymer whose main chain can comprise largely of linked indane moieties. This process is believed to comprise an initial protonation of an isopropenyl group, addition to the resulting carbocation by a second isopropenyl group which is followed by intramolecular ring-closure.

Formation of the instant polyindanes takes place in a stepwise manner with concomitant cyclization only at sufficiently high reaction temperatures, typically at about 60° C. or higher. The process results in little or no formation of unsaturated linear (substituted 1-, or 2-pentene) structures and, therefore, affords no opportunity for chain branching and cross-linking. The resulting polyindane resins can have low molecular weights. In the present invention, the main chain of the polyindane resin comprises or consists essentially of indane units, not counting the chain ends. The preparation of such resins by treatment of a polyisopropenylbenzene with a cationic catalyst was reported by H. Brunner, et al., J. Polymer Science-Polymer Letters, 1958, Volume 28, p. 629, and is also taught by Gloth, R. E., and Tazuma, J. J., in U.S. Pat. No. 4,205,160, the disclosures of which are incorporated herein by reference in their entireties.

If the reaction mixture comprises a mono-isopropenyl aromatic compound (e.g., alpha-methylstyrene) or an olefin (e.g., isobutylene, diisobutylene, d-limonene, styrene, and the like), the stepwise growth of the polyindane chain can be intercepted and likely terminated by the olefin moiety. Polyindanes of the present invention can, therefore, be controlled to any molecular weight by deliberate use of such olefin "terminators," with the molecular weight decreasing with increasing concentration in the reaction mixture of the olefin. When a chain terminator is added, the amount of the chain terminator can range from about 0.01 wt % to about 50 wt %, from about 0.01 wt % to about 40 wt %, from about 0.01 wt % to 30 wt %, from about 0.1 wt % to 20 wt %, from about 0.5 wt % to about 10 wt %, and from about 0.5 wt % to 5 wt % based on the total amount of monomer. Chain termination can also occur even in the absence of an olefin terminator, likely by chain scission, especially at higher reaction temperatures. The present invention is, therefore, not bound by the exact mode of termination. For example, a starting mixture consisting of a major portion of 1,3-diisopropenylbenzene and a minor portion of alpha-methylstyrene, may yield a polyindane having the structure depicted in FIG. 3, which shows only one of many possible isomers.

Selection of the most favorable starting polyisopropenyl aromatic compounds, terminators, and reaction conditions affords, after removal by vacuum stripping of process solvent and any unreacted monomers, clear, hard, and amorphous polyindanes having narrow molecular weight distributions ("MWD") and relatively high $T_g$ values. The latter are typically in excess of 50° C. and above 100° C. for indane resins of higher MW. In certain embodiments, the $AU_n$ monomer contains n=2 and comprises meta-diisopropenylbenzene, para-diisopropenylbenzene, or a mixture of these two positional isomers.

In various embodiments, at least 90% of the main chain of the polyindane resins may be formed from the indane repeat units. The percentage of cyclized repeat units forming the polyindane structure is a function of the polymerization parameters chosen.

Typically, the process for the preparation of the polyindane resins comprises the slow addition of the polyisopropenylbenzene monomer to a mixture of solvent and catalyst at the desired temperature. The length of the monomer addition period is not critical, but should be completed as rapidly as removal of the heat of reaction allows. Further reaction time of 1-5 hours may be beneficial in obtaining the highest resin yield because unconverted monomer may still be present after completion of monomer addition. However, longer reaction times may be unnecessary and risk the formation of polyindane resins having a wider MWD.

Polyindane resins suitable for use in accordance with this invention may be fully aromatic or partially or substantially saturated. Any desired degree of saturation may be readily accomplished by catalytic hydrogenation by any well-known procedures, such as treating a solution of the polyindane resin in an inert solvent such as hexane, heptane, cyclohexane, mineral spirits, and the like with hydrogen under high pressure in the presence of a supported nickel, platinum, palladium, or ruthenium-containing catalyst.

In various embodiments, polyindane resins prepared by treating pure diisopropenyl aromatic compounds or isomeric mixtures thereof resulting from the dehydrogenation of di-propylated aromatic feedstocks, especially benzene, and optionally terminated by a significant portion of a mono-olefin such as styrene, isobutylene, diisobutylene, limonene, and alpha-methylstyrene, are useful as tackifiers for commonly used elastomers, such as various polyolefins and poly(styrene-co-olefin) block copolymers.

In various embodiments, the starting materials for the formation of polyindane polymers can include diolefins comprising 1,2-, 1,3-, and 1,4-diisopropenylbenzene; 2,3-, 2,4-, and 2,5-diisopropenyl-1-methybenzene; 2,3-,2,4-, and 2,5-diisopropenyl-1-ethylbenzene; diisopropenyl-ortho-xylene; diisopropenyl-meta-xylene; and/or diisopropenyl-para-xylene. These diolefins may also be in admixture with an aromatic mono-olefin, $Al_mU$, and tri-olefin compounds, $AU_3$, which may be present as a result of the dehydrogenation process used to make the diolefin from the starting polyisopropylaromatic compound, $Al_n$. Other polymerizable compounds that may be present are des-methyl isomers, for example, 1-isopropenyl-2-(or 3-, or 4-vinyl) benzene or 2-isopropenyl-3-(or 4-, or 5-vinyl)-1-methylbenzene.

As discussed above, a large number of aromatic and non-aromatic mono-olefins can act as terminators during the production of polyindanes. In the absence of a deliberately-added chain terminator, various mechanisms for chain termination are likely, such as proton transfer and chain scission, but the preferred method of molecular weight control is by the addition to the monomer mixture of a mono-olefin such as styrene, vinyl toluene, alpha-methylstyrene, isobutylene, diisobutylene, 2-methyl-1-butene, 2-methyl-2-butene, dimers or oligomers thereof, combinations thereof, or, preferably, any of the possible $Al_nU$ species present in the product of the dehydrogenation process, for example, 1-isopropenyl-2 (or -3, or -4-isopropyl)benzene or 1-isopropenyl-2 (or -3, or -4-isopropyl)-1-methylbenzene.

In various embodiments, the catalyst that affects the desired oligomerization and indane ring formation comprises any free, complexed, or supported Brønsted acid including concentrated aqueous phosphoric, sulfuric, nitric, or hydrochloric acids, a FILTROL (or similar) acid-activated clay, perfluoroalkanoic acids such as trifluoroacetic acid, and sulfonic acids such as para-toluenesulfonic acid, methanesulfonic acid, AMBERLYST (or similar) sulfonic acid supported on crosslinked polystyrene beads, and/or NAFION supported fluorinated sulfonic acid.

Lewis acids are also polyisopropenyl aromatic compound polymerization catalysts. Examples of Lewis acids include, but are not limited to, Friedel-Crafts metal halides (e.g., boron trifluoride, stannic chloride, aluminum chloride, aluminum bromide, titanium tetrachloride, zinc chloride, ferric chloride, vanadium chloride, and phosphorus pentafluoride); and organometallic catalysts including diethyl aluminum chloride, ethyl aluminum dichloride, and their complexes. Boron trifluoride may be in the anhydrous gaseous form or a solid or liquid form such as boron trifluoride complexed with a wide variety of organic compounds. Effective examples of complexing organic compounds are the lower fatty acids such as acetic and propionic acid, dialkyl ethers, such as methyl ethyl ether, ethyl ether, and propyl ethers, phenols and lower alkyl alcohols and esters. Preferred catalysts include boron trifluoride-acetic acid and boron trifluoride-ethyl ether.

The acid-activated clay catalyst may include naturally occurring clay mineral such as kaolinite, bentonite, attapulgite, montmorillonite, clarite, Fuller's earth, hectorite, or beidellite. The montmorillonite can be treated with a member selected from the group consisting of sulfuric acid and hydrochloric acid. The acid activated clay may include synthetic clay. The synthetic clay may include one member selected from the group consisting of saponite and hydrotalcite. The acid activated clay may include modified clay such as pillared clay. The pillared clay may include one member selected from the group consisting of aluminum oxide pillared clay, cerium modified alumina pillared clay, and metal oxide pillared clay. The acid activated clay may include Brønsted acid on clay, wherein the Brønsted acid includes a member selected from the group consisting of hydrofluoric acid, sulfuric acid, nitric acid, phosphoric acid, and hydrochloric acid. One example of a commercially available solid acid clay catalyst suitable for use in embodiments of the present invention is FILTROL F-22 (and similar) acid clay catalyst, available from BASF Corporation (Iselin, N.J.). The Brønsted acid may be impregnated onto silica, silica-alumina, amorphous silica-alumina, a zeolite, or a mesoporous form of silica, alumina, or silica-alumina. Various methods for drying the sulfonic acid-bound resin or acid-activated clay catalyst are useful to remove bound and/or freely-associated water, thereby maximizing catalyst acidity and activity, for example, vacuum oven drying or azeotropic distillation.

The polymerization reaction can be carried out in a continuous, batch, or semi-batch mode and the reactor can comprise any suitable type of reactor, including, for example, a fixed bed reactor, a fluidized bed reactor, a continuous stirred tank reactor (CSTR), a plug-flow reactor, a continuous loop tubular reactor, and combinations thereof. The reactors can be equipped with internal and/or external cooling to maintain the polymerization temperature. The reaction may be carried out with a pressure sufficient to prevent substantial loss by evaporation of the reactants and/or diluent typically being used. Sub-atmospheric, atmospheric and super-atmospheric pressures may be employed.

The polyisopropenyl aromatic compound-containing feedstock, and optional mono-olefin terminator compound ("monomer" or "monomers"), the processing solvent (i.e., the diluent), and the catalyst can be introduced into the reactor in any suitable order. In one embodiment, the polyisopropenyl aromatic compound-containing feedstock and the mono-olefin terminator compound are added to the reactor at the same time in separate streams or as a mixture. In a further embodiment, the catalyst and solvent are added to the reactor as a mixture.

The reaction mixture may be polymerized in the presence of an inert hydrocarbon material as a diluent or solvent. Typically, the inert solvent is a non-olefinic aliphatic or aromatic hydrocarbon composition, which is in the liquid state under the conditions of polymerization. As used herein, the terms "inert solvent" and "inert polymerization solvent" refer to a solvent that does not significantly participate in the polymerization reaction. Although not wishing to be bound by theory, it is hypothesized that, unlike many reactive solvents, the molecular structures of inert solvents may not alkylate the growing polymer chain. Inert solvents can comprise one or more aliphatic hydrocarbon compounds, including, for example, straight-chain aliphatic hydrocarbons such as hexanes, heptanes, octanes, and isomers thereof; cycloaliphatic hydrocarbons including cyclohexanes such tetramethylcyclohexane and trimethylcyclohexane, and isomers thereof; halogen-substituted hydrocarbon compounds, such as methylene chloride; and non-aromatic distillate blends. An inert solvent may also include a small amount of one or more reactive aromatic hydrocarbon compounds, while still maintaining its non-reactive functionality. Examples of suitable inert solvents, can include, but are not limited to, mineral spirits such as white spirits, Stoddard solvent, odorless mineral spirits, Rule 66 mineral spirits, and combinations thereof. The process solvent can include, if it is suitable, reclaimed or recycled solvent.

The processing solvent may be an aromatic solvent whose constituents contain cyclic carbon-to-carbon double bonds or aliphatic solvents whose constituents contain no cyclic carbon-to-carbon double bonds. Examples of suitable polymerization solvents can include, but are not limited to, benzene, alkyl-substituted benzenes such as xylene and toluene, ethyl benzene, ethyl toluene, indene, cumene, or trimethylbenzene. The diluent may also be selected from solvents such as petroleum naphtha, hexane, and light aromatic petroleum distillates such as "Aromatic A-100" (commercially available from ExxonMobil Chemical Co.), "HiSol 10" (commercially available from Ashland Chemical Inc.), and "Cyclosol 53" (commercially available from Shell Chemical Co.). Minor portions of these solvents may be incidentally incorporated into the hydrocarbon resin such as by alkylation.

The monomer feed and/or the catalyst-containing feed can be combined with one or more process solvents prior to, or shortly after, being introduced into the reactor. The monomer and catalyst-containing feed can be introduced into the process reactor at substantially the same time. The catalyst or pre-mixed catalyst/solvent slurry can be introduced into reactor, after the reactor has been initially charged with monomer. This addition of catalyst or catalyst/solvent slurry to the monomer is referred to as "straight addition." Alternatively, the monomer feed can be added incrementally or continuously, to pre-mixed catalyst/solvent slurry or a fixed bed of pelletized catalyst initially charged or loaded into to polymerization reactor. The addition of the monomer to the catalyst or catalyst/solvent slurry can also be referred to as "reverse addition."

In various embodiments, the process temperatures are in the range 0 to 150° C. Generally, the most convenient and useful process temperatures are about 40 to 120° C., more preferably from 60 to 100° C. The preferred reaction temperature depends on the catalyst used and, because it has an effect on polymer structure, must be chosen to optimize the formation of the desired indane structure.

The polyindane-forming reaction is carried out for a sufficient amount of time in order to achieve a desired polymer yield, molecular weight, and softening point. Any suitable system for controlling the reaction temperature within reactor can be used, including, for example, an external heat exchanger loop, one or more internal cooling coils, and/or a reactor-cooling jacket.

Once complete, the polyindane-forming reaction can be stopped by physically separating the liquid reaction medium from the solid catalyst or the catalyst may be neutralized with a suitable reagent. The latter is accomplished by treating the reaction product solution with clay, e.g., attapulgus clay, or fuller's earth, or a combination of hydrated lime and clay, to neutralize the catalyst, with the catalyst/clay sludge thereafter being removed by filtration. Caustic or soda ash (sodium carbonate) solutions may also be used to neutralize the catalyst.

The resin product can then recover from the reaction mixture by conventional methods such as distillation, flash evaporation under vacuum or at atmospheric pressure, or liquid phase precipitation in a suitable non-solvent such as methanol or isopropanol or combinations thereof. The solvent and polymerizate oils (e.g., dimers, trimers, and oligomers, as well as other reaction byproducts) can be separated from the polymer product.

The resin product can also be further processed to remove additional oligomers and polymerizate oils. "Oligomers" are defined as dimer, trimers, tetramers, and pentamers. Processes for removing oligomers and polymerizate oils can be any that is known in the art. For example, membrane separation, selective precipitation, selective polymerization conditions, evaporation, distillation, and gel permeation chromatography can be utilized.

Furthermore, in various embodiments, the polyindane resins of this invention may be modified by hydrogenating the aromatic unsaturation to different degrees. Examples of modifications to enhance the resins' usefulness in their intended end-use applications include, but are not limited to, improving the color, the oxidative and thermal stabilities, and the compatibility with polymers and other formulation components.

The liquid-phase catalytic hydrogenation reaction is generally carried out in the presence of hydrogen and a suitable base metal or noble metal catalyst. Examples of useful catalysts include, but are not limited to, nickel, palladium, other precious metals such as platinum or ruthenium, and mixed metal catalysts such as copper-chromite and copper-zinc, frequently employed on a support including, but not limited to, carbon, silica, or alumina. Diluents (solvents) may be added to improve handling, heat transfer, and processability by lowering the resins' viscosity. Examples of suitable solvents include, but are not limited to, Stoddard solvents, mineral spirits, hexane, and heptane. Aromatic solvents may be used, but more typically, aliphatic solvents are used to minimize hydrogen consumption and heat evolution. The process is operated at the lowest effective temperature and highest pressure to achieve the desired conversions. Typically, temperatures ranging from 150 to 260° C. and pressures of 300 to 3,000 psig are employed. The process may be operated either isothermally or adiabatically. Processing conditions are controlled to maintain the highest catalyst activity and to minimize the deactivation mechanisms of catalyst sintering, coking, and poisoning. Processing conditions include inlet and outlet temperature, reactor pressure, hydrogen flowrate, adiabatic temperature rise, and hydrogen consumption concentration.

Many types of reactors can be used. Examples of suitable batch-slurry reactors include, but are not limited to, a standard batch reactor and an advanced batch reactor manufactured by the Biazzi Corporation in Switzerland. Examples of continuous reactors include a stirred tank reactor with a catalyst slurry, an advanced loop reactor with a catalyst slurry (such as those manufactured by Buss Chemtech, Switzerland), an isothermal trickle-bed reactor with a packed bed pelletized catalyst, and an adiabatic trickle-bed reactor with a pelletized catalyst.

The general procedure for batch hydrogenation is to charge the polyindane resin, solvent (if needed), and catalyst to the reactor. After flushing the reactor with nitrogen to ensure an inert atmosphere, the hydrogen is fed into the reactor until the final desired pressure is achieved. During this time, the hydrogen flow is controlled to maintain the pressure. The reactor temperature is controlled by selective heating/cooling as needed. When the desired degree of hydrogenation is achieved, the reactor contents are cooled, the reactor is vented and flushed with nitrogen to prepare it for the next batch. The catalyst is removed by filtration and the resin products are isolated by distilling off the solvent and oligomer oils.

The general procedure for continuous hydrogenation is to dissolve the resin in a suitable aliphatic solvent and feed the resin solution at a controlled rate to maintain the reactor temperature into the reactor containing a fixed bed of pelletized catalyst. The hydrogen flow rate, inlet and outlet temperatures, and reactor pressure are controlled to achieve the desired degree of hydrogenation. During the reaction, a portion of the reactor effluent may be recycled back to the reactor to maintain temperatures and achieve the desired degree of hydrogenation. The reactor effluent is subsequently sent through one or more vessels to cool the solution and reduce the pressure to atmospheric. The resin product is then isolated by distilling off the solvent and oligomer oils.

The inventors hereby state their intent to rely on the Doctrine of Equivalents to determine and assess the reasonably fair scope of the present invention as it pertains to any apparatus not materially departing from but outside the literal scope of the invention as set forth in the following claims.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

This invention can be further illustrated by the following examples of embodiments thereof, although it will be understood that these examples are included merely for the purposes of illustration and are not intended to limit the scope of the invention unless otherwise specifically indicated.

EXAMPLES

Examples 1-5: Alkylation of Toluene with Propylene

Example 1

Zeolite-Y (4.4 grams, CBV 780, Zeolyst) and toluene (220 grams) were charged into a 300 milliliter autoclave. The autoclave was leak tested with 500 psig nitrogen then the pressure was reduced to about 5 psig and propylene (251.2 grams) was added. The autoclave was heated to 150° C. and agitated with a mechanical stirrer at 800 rpm. After 5 hours at 150° C., the autoclave was cooled to ambient temperature and the product discharged. Toluene conversion was estimated as 43% based on gas chromatography (GC) peak area % analysis. The relative distribution of monoisopropyltoluene, diisopropyltoluene, and triisopropyltoluene products was 72%, 25%, and 3%, respectively.

Example 2

4.0 grams of Zeolite-Y (CBV 780, Zeolyst) and 200 grams of toluene were charged into a 300 milliliter autoclave. The autoclave was pressurized with 500 psig nitrogen for a leak test. The pressure was then reduced to about 5 psig and 274 grams of propylene were added to the autoclave. The autoclave was heated to 170° C. and agitated with a mechanical stirrer at 800 rpm. After 5 hours at 170° C., the autoclave was cooled to ambient temperature. The product was discharged from the autoclave and analyzed. Based on GC peak area percentage, toluene conversion was 48%. The distribution of monoisopropyltoluene, diisopropyltoluene, and triisopropyltoluene was 64%, 31%, and 5%, respectively.

Example 3

0.5 grams of Zeolite-beta (CP 814E, Zeolyst, calcined in air at 400° C. for 4 hours prior to use) and 50 grams of toluene were charged into a 100 milliliter autoclave. The autoclave was pressurized with 300 psig nitrogen for a leak test. The pressure was then reduced to about 2 psig. Propylene was introduced into the autoclave from a cylinder via stainless steel tubing. The propylene cylinder pressure was maintained at 100 psig during reaction. The valve between the autoclave and the propylene cylinder was kept open. The autoclave was then heated to 150° C. and agitated with a mechanical stirrer at 800 rpm. After 4 hours at 150° C., the propylene line was closed and the autoclave was cooled to ambient temperature. The product was discharged from the autoclave and analyzed. Based on the GC peak area % data toluene conversion was 27%. The distribution of monoisopropyltoluene, diisopropyl-toluene, and triisopropyltoluene was 92%, 8%, and 0%, respectively.

Example 4

0.5 grams of Zeolite-Y (CBV 400, Zeolyst) and 50 grams of toluene were charged into a 100 milliliter autoclave. The autoclave was pressurized with 300 psig nitrogen for a leak test. The pressure was then reduced to about 2 psig. Propylene was introduced into the autoclave from a cylinder via stainless steel tubing. The propylene cylinder pressure was maintained at 100 psig during reaction. The valve between the autoclave and the propylene cylinder was kept open. The autoclave was then heated to 150° C. and agitated with a mechanical stirrer at 800 rpm. After 4 hours at 150° C., the propylene line was closed and the autoclave was cooled to ambient temperature. The product was discharged from the autoclave and analyzed. Based on GC peak area %, data toluene conversion was 74%. The distribution of mono-isopropyltoluene, diisopropyltoluene, and triisopropyltoluene was 44%, 42%, and 15%, respectively.

Example 5

0.5 grams of Zeolite-Y (CBV 780, Zeolyst) and 50 grams of toluene were charged into a 100 milliliter autoclave. The autoclave was pressurized with 300 psig nitrogen for a leak test. The pressure was then reduced to about 2 psig. Propylene was introduced into the autoclave from a cylinder via stainless steel tubing. The propylene cylinder pressure was maintained at 100 psig during reaction. The valve between the autoclave and the propylene cylinder was kept open. The autoclave was then heated to 150° C. and agitated with a mechanical stirrer at 800 rpm. After 4 hours at 150° C., the propylene line was closed and the autoclave was cooled to ambient temperature. The product was discharged from the autoclave and analyzed. Based on GC peak area % data, toluene conversion was 78%. The distribution of mono-isopropyltoluene, diisopropyltoluene, and triisopropyltoluene was 60%, 28%, and 12%, respectively.

Example 6—Dehydrogenation

Dehydrogenation of isopropyl-substituted aromatic compounds, such as cumene, cymene, diisopropyltoluene, and triisopropylbenzene, to the corresponding olefin or mixture of olefins was carried out in a reactor system consisting of low-flow liquid feed pumps, a preheater section operating at about 270° C. to vaporize each of the two feed streams (water and hydrocarbon), a super-heater for the combined vaporized feeds to raise the vapor temperature to close to the desired reaction temperature (about 500-620° C.), an electrically-heated furnace with a cylindrical inner cavity capable of holding a 3-foot-long column, a vertically-mounted cylindrical fixed-bed reactor (diameter of 1.5", height of 28") made of Alloy 800H steel and packed with process catalyst and indented with wells for thermocouples, and a product vapor condenser section consisting of an angled, jacketed steel pipe chilled by cold water. The reactor was configured such that reactants flowed to the catalyst bed at the top and products exited the catalyst bed at the bottom. The reactor system was connected to a steam-jet vacuum line to allow for a reduced pressure operation and to a nitrogen line to allow purging with inert gas.

The size or volume (V) of the catalyst bed to accommodate the flow (F) at the desired conversion depended critically on the required liquid hourly space velocity (LHSV=F/V). The LHSV was about 0.2-0.3 $h^{-1}$.

The catalyst was a commercial potassium and cerium ion-doped iron oxide in the form of an extrudate pellet having a 3 mm diameter and a length of 1-2 cm. When packed, this material occupied about 54% of the available volume, leaving a void of about 46% of the available space through which the reaction vapors could move with little pressure drop. The catalyst bed was kept blanketed with nitrogen and steam when not in use at elevated temperatures.

Dehydrogenation of an isopropyl-substituted aromatic compound was performed by pumping feed hydrocarbon and steam into the pre-heater section, combining the vapors in the super-heater section, passing these into the reactor section through the catalyst bed, condensing the product vapors in the condenser section, and allowing the hydrogen gas so liberated to pass out of the system through a vent line. The best operating conditions fell into the following ranges: an operating temperature of 550-620° C.; a system pressure of 1.0-0.33 atm; a feed flow rate of 1.0-2.0 ml/min; and a water flow rate of 1.0-4.0 ml/min.

1,3,5-triisopropylbenzene was provided to the reactor at a flow rate of 1.0 ml/min, with water also at 1.0 ml/min, and the super-heated combined vapors were passed over the reactor bed held at a middle-of-the-bed temperature of 580° C. and a system pressure of 0.33 atm. Product exiting the reactor contained the following components (by gas chromatography): triisopropylbenzene, 21.5%; diisopropyl-mono-isopropenylbenzene, 20.2%; isopropyl-di-isopropenylbenzene, 17.1%; and triisopropenylbenzene, 8.4%. This result represents a conversion of about 78.5% with selectivity to isopropenyl aromatic compounds of at least 58.2%. In addition, the product contained components totaling about 9-10% that were not positively identified, but believed to be olefins having a vinyl group in place of an isopropenyl group. Taking these compounds into account, the selectivity for all potentially polymerizable compounds was about 87%.

Examples 7-27—Oligomerization

Oligomerization of a diolefin monomer comprising high-purity meta-diisopropylbenzene (DIPB) blended with a lesser amount of the mono-olefin terminator dissolved in a roughly equal weight of solvent proceeded by the gradual addition of these reactants to a mixture (solution or suspension) of catalyst and solvent in a stirred reactor under a nitrogen gas blanket. The rate of addition was as rapid as heat-removal allowed such that the desired reaction temperature remained constant. The properties of the polymers produced with this process is described in Examples 7-27 below and in TABLES 1 and 2.

Example 7

The reactor charge was 75 mL of heptane and 15 grams of oven-dried AMBERLYST®15 sulfonic acid beads. The monomer mixture added to that charge comprised 40 grams of meta-diisopropenylbenzene, 40 grams of diisobutylene (mixed isomers, about 75% as 2,4,4-trimethyl-1-pentene), and 75 mL of heptane. The addition time was 3 hours and the reaction temperature was 80° C. Filtration to remove the catalyst and solvent stripping under reduced pressure of about 1 torr with heating to a temperature of about 180° C. afforded a clear and nearly colorless resinous brittle solid product having a softening point (Ring & Ball method) of 79° C. and a weight-average molecular weight (Mw) of 900 daltons.

Example 8

The reactor charge was 50 mL of cyclohexane and 10 grams of oven-dried AMBERLYST®15 sulfonic acid beads. The monomer mixture comprised 35 grams of DIPB, 15 grams of styrene, and 50 mL of cyclohexane. The addition time was 2 hours and the reaction temperature 80° C. Product work-up consisted of filtration to remove the catalyst and stripping under reduced pressure of about 1 torr with heating to a temperature of about 180° C. to remove solvent. The product was a clear and nearly colorless brittle solid product having a softening point (Ring & Ball method) of 111° C. and an Mw of 1150 daltons.

Examples 9-21

The procedures of Examples 9-21 were similar to those of Examples 7 and 8 and used (as the mono-olefin terminator) diisobutylene, styrene, vinyl toluene, indene, or alpha-methyl styrene (AMS) as depicted in TABLE 1 in the amounts listed. The properties of the resins in these examples show the versatility of the process. Examples 14-21 illustrate the ability to tailor the properties of these novel hydrocarbon resins by varying feedstock ratios and polymerization conditions to make different resins using a single terminator, namely, AMS.

TABLE 1

Experimental Details for AMBERLYST ®15-Mediated Co-reactions of meta-Diisopropenyl-benzene and Various Mono-Olefin Terminators

| Ex. # | Terminator | React Temp. (° C.) | Terminator Wt. Fraction | Resin Molecular Weight Profile | | | | RBSP (° C.) |
|---|---|---|---|---|---|---|---|---|
| | | | | Mn | Mw | Mz | MWD | |
| 7 | Diiso-butylene | 80 | 0.50 | 660 | 900 | 1400 | 1.36 | 79 |
| 8 | Styrene | 80 | 0.30 | 655 | 1150 | 2099 | 1.76 | 111 |
| 9 | Diiso-butylene | 80 | 0.25 | 930 | 1382 | 2482 | 1.49 | 140 |
| 10 | Diiso-butylene | 80 | 0.38 | 800 | 1120 | 1840 | 1.40 | 140 |
| 11 | Styrene | 75 | 0.34 | 720 | 1337 | 2853 | 1.86 | 112 |
| 12 | Vinyl-toluene | 80 | 0.30 | 778 | 1360 | 2510 | 1.75 | 121 |
| 13 | Indene | 80 | 0.30 | 475 | 786 | 1680 | 1.65 | 81 |
| 14 | AMS | 80 | 0.50 | 503 | 620 | 770 | 1.24 | 94 |
| 15 | AMS | 80 | 0.45 | 570 | 757 | 1045 | 1.32 | 99 |
| 16 | AMS | 80 | 0.43 | 530 | 790 | 1196 | 1.49 | 92 |
| 17 | AMS | 80 | 0.30 | 640 | 935 | 1415 | 1.46 | 113 |
| 18 | AMS | 80 | 0.28 | 714 | 1110 | 1820 | 1.56 | 126 |
| 19 | AMS | 80 | 0.15 | 990 | 1990 | 4070 | 2.01 | 169 |
| 20 | AMS | 105 | 0.10 | 785 | 1200 | 1890 | 1.52 | 141 |
| 21 | AMS | 55 | 0.10 | 1150 | 3280 | 9040 | 2.85 | 179 |

Examples 22-27

The procedures of Examples 22-27 were similar to those of Examples 7 and 8, but used FILTROL 22 acid clay as catalyst. TABLE 2 lists the molecular characteristics of the representative polyindane resins terminated with three different mono-olefins, namely, alpha-methyl styrene (AMS), styrene, and 4-methyl-alpha-methylstyrene (Cymenene).

TABLE 2

Properties of Polyindane Resins Prepared From meta-Diisopropenylbenzene Using an Acid Clay as Oligomerization Catayst

| Sample | 22 | 23 | 24 | 25 | 26 | 27 |
|---|---|---|---|---|---|---|
| DIPB (g) | 200 | 185 | 155 | 140 | 140 | 140 |
| AMS (g) | 50 | 65 | 95 | 110 | — | — |
| Cymenene (g) | — | — | — | — | — | 110 |
| Styrene (g) | — | — | — | — | 110 | — |
| MMAP | 22.5 | 18.5 | 16.6 | 11.9 | 4.7 | 25.6 |
| RBSP (° C.) | 126.9 | 108.7 | 104.0 | 95.0 | 100.0 | 106.9 |
| $M_n$ | 822 | 663 | 628 | 575 | 646 | 646 |
| $M_w$ | 1255 | 951 | 857 | 783 | 982 | 888 |
| $M_z$ | 1877 | 1385 | 1195 | 1099 | 1527 | 1249 |
| MWD ($M_w/M_n$) | 1.53 | 1.44 | 1.37 | 1.36 | 1.52 | 1.37 |
| $T_g$ (DSC, ° C.) | 90.5 | 71.8 | 67.5 | 56.8 | 56.5 | 70.0 |

Examples 28 and 29—Hydrogenation

Example 28

A solution of 90 grams of the resin in Example 11 from TABLE 1 was mixed with 90 milliliters of EXXSOL™ dearomatized hydrocarbon fluid (ExxonMobil Corp.) in an autoclave and 18 grams of Ni 5256 nickel catalyst (BASF Corporation) was charged to the mixture. The mixture was heated to 220° C. and the autoclave was pressurized to 2000 psig hydrogen. The product, after stripping under vacuum to 180° C., had a ring and ball softening point of 111° C., a molecular weight profile of Mn 644, Mw 1067, and Mz 1937, and a proton area % aromaticity by NMR of <5%.

Example 29

The resin of Example 16 was hydrogenated according to the procedure of Example 28. The product, after stripping under vacuum, had a ring and ball softening point of 99° C., a molecular weight profile of Mn 425, Mw 610, and Mz 840, and an NMR proton area % aromaticity of <2%.

Examples 30 and 31—SIS-Based Nonwoven Construction Adhesives

Test adhesive formulations were prepared by thoroughly mixing a test resin (60% by weight), Kraton™ D-1165 (styrene-isoprene-styrene block copolymer, Kraton Performance Polymers, Inc., 20% by weight), Calsol™ 5550 (naphthenic oil, Calumet Specialty Products Partners, L.P., 20% by weight), and Irganox™ 1010 (anti-oxidant, BASF Corp., 0.5% by weight). The test resins that were used included Examples 9 and 15 in TABLE 1 and, for comparison, commercial resins REGALITE™ S5100 and REGALITE™ R1100 (Eastman Chemical Co.). All four adhesive formulations were sprayed about 320° F. (160° C.) in a nonwoven/film laminate construction with about 4 g/sq·m applied coat weight and/or were coated onto Mylar as a tape. TABLE 3 lists the Peel Test results for the nonwoven construction and Peel and Shear Test results for the tapes.

The following test methods were utilized in this example. NW Peel Strength is a test used to determine the bond strength between layers in the laminates for the various samples. It was measured as 180 degrees peel strength using a MTS Criterion Universal Tensile Tester model C43-104E with a 500 N (112 lbf) load cell (model LPB 502) at a cross-head speed of 30 mm/min. The MTS instrument was controlled by Test Works 4 (version 4.12D) software installed on a HP computer system. Samples were conditioned at 40° C. for 4 hours to generate the 4-hour NW peel strength data. The peel force per unit width was measured in accordance with PSTC 101: "Peel Adhesion of Pressure Sensitive Tape Test Method A—Single-Coated Tapes, Peel Adhesion at 1800 Angle." Rectangular strips of 25 mm×250 mm (1"×10") dimensions were tested using a Universal Testing Machine (UTM) at 5 mm/s (12 inch/minute) cross-head displacement rate.

Shear measurements were made according to PSTC-107 method, "Shear Adhesion of Pressure Sensitive Tapes" using a Cheminstruments 30 Bank Shear Tester. A 25 mm×25 mm (1 in×1 in) piece of tape was adhered to a stainless steel or LDPE panel using one complete pass of a 4.5 lb hand roller. A mass of 1 kg was suspended from the tape. The time (min) at which the adhesive failed cohesively was recorded as the shear holding power. After reaching a maximum time of 10,000 min, the adhesives were removed from the test apparatus. The average of five samples is reported.

TABLE 3

SIS-Based Nonwoven (NW) Construction Adhesive Evaluation Results

| | Example Number | | | |
|---|---|---|---|---|
| | 30 | 31 | Comparison Test Resin | Comparison |
| Adhesive Test | Example 9 | Example 15 | S5100 | R1100 |
| NW Peel strength, initial, g/mm | — | 4.5 | 4.5 | — |
| NW Peel strength, aged 4 h @ 40° C., g/mm | — | 5.7 | 5.2 | — |
| Peel, stainless steel substrate, lbs/in | — | 6.9 | — | 7.0 |
| Peel, LDPE substrate, lbs/in | — | 5.9 | — | 6.3 |
| Shear, stainless steel substrate, minutes | >4000 | 3700 | — | >4000 |
| Shear, HDPE substrate, minutes | >4000 | >4000 | — | >4000 |

Examples 32 and 33—SBS-Based Adhesives

Test adhesive formulations were prepared by thoroughly mixing a test resin (60% by weight), Kraton™ D-1102 (styrene-butadiene-styrene block copolymer, Kraton Performance Polymers, 20% weight), Calsol™ 5550 (naphthenic oil, Calumet Specialty Products Partners, 20% weight), and Irganox™ 1010 (anti-oxidant, BASF Corp., 0.5% weight). Test resins used were Examples 10 and 15 in TABLE 1 and, for comparison, commercial resin REGALITE S5100 (Eastman Chemical). All three adhesive formulations were coated as one mil thick adhesives on Mylar and tested as pressure sensitive adhesives by applying to stainless steel and polyethylene (LDPE) substrates. TABLE 4 lists the Peel and Shear Test results. Test methods were the same as utilized in Example 31.

TABLE 4

SBS-Based Adhesive Evaluation Results

| | Example Number | | |
|---|---|---|---|
| | 32 | 33 | Comparison Test Resin |
| Adhesive Test | Example 10 | Example 15 | S5100 |
| Peel, stainless steel substrate, lbs/in | 8.1 | 6.6 | 4.6 |
| Peel, LDPE substrate, lbs/in | 3.8 | 2.0 | 1.4 |
| Shear, stainless steel substrate, minutes | >10,000 | 286 | >10,000 |
| Shear, HDPE substrate, minutes | >10,000 | 254 | >10,000 |

Example 34: Packaging Adhesive Formulations

Test adhesive formulations were prepared by thoroughly mixing a test resin (40% weight), AFFINITY™ GA 1950 plastomer (Dow Chemical, 40% weight), Sasolwax™ H1 wax (Sasol Corp., 20% weight), and Irganox™ 1010 (BASF, 0.5% weight). Test resins used were Example 29 and, for comparison, commercial resin REGALITE™ 1100 (Eastman Chemical). Both adhesive formulations were applied to a cardboard substrate for testing. TABLE 5 lists the formulation viscosity, RBSP and adhesion test results.

The following test methods were used in this example. The Brookfield viscosity was tested according to ASTM D-3236 ASTM D3236, "Standard Test Method for Apparent Viscosity of Hot Melt Adhesives and Coating Materials" using a Thermosel™ at the specified temperature.

Ring & Ball softening point was determined according to ASTM D-6493.

Bonded samples for fiber testing were prepared using hot melt tester model ASM-15N manufactured by Mitsubishi Electric Corporation (MEC) in Japan according to JAI Method JAI-7-B, with cardboard flutes perpendicular. The fiber tear test consists of manually tearing glued cardboard substrates by hand under the conditions of room temperature or 0° C. The glued cardboard substrates were conditioned at temperature for at least 10 hours before testing. A minimum of 5 specimens are tested for each test.

TABLE 5

AFFINITY-Based Packaging Adhesive Evaluation Results

| | Example Number | |
|---|---|---|
| | 34 | Comparison Test Resin |
| Formulation Test | Example 29 | R1100 |
| Viscosity, 177° C., cP | 1125 | 1390 |
| Ring and Ball Softening Point, ° C. | 104 | 109 |
| % Fiber Tear at RT | 100 | 100 |
| % Fiber Tear at 0° C. | 100 | 100 |

Examples 35 and 36: Non-Vulcanized Thermoplastic Elastomer (TPE) Binary Formulations Test thermoplastic elastomer formulations were prepared by thoroughly mixing a test resin (20% weight) and Kraton D-1650 (styrene-ethylene/butylene-styrene block copolymer, Kraton Performance Polymers, (80% weight). Test resins used were Example 21 and Example 22, and, for comparison, commercial resin Regalite® S7100 and Endex® 155 (Eastman Chemical). TABLE 6 lists the formulation test results, showing the surprising increase in tear strength, % modulus, tensile, and compression set. The following test methods were utilized in this example. Compounds were prepared by mixing in a Brabender large bowl with Roller blades at 220° C. for 15 minutes at 75 rpm. All of the blends were formed into plaques (5×5×⅛") and (4×4×¼") by compression molding in a heated Carver press at 180° C. and approximately eight tons of pressure for five minutes. The plaques were tested for percent transmittance with a Gardner Haze-gard Plus instrument. The films were then die cut into test articles for various physical tests including tear strength, tensile, compression set. Remaining material was cut up into pellet sized pieces for melt flow rate measurements.

Tensile samples were die-cut and tested in accordance to ASTM D638 (Type V) and tested on a MTS Criterion Universal Tensile Tester model C43-104E. Tear samples were die cut to compliance with ASTM D624 (die C).

Tensile strength, modulus and elongation at break were measured as per ASTM D412 using a MTS Criterion Universal Tensile Tester model C43-104E at a crosshead speed of 500 mm/min. Tear strength was measured at the same conditions following ASTM D624. The results of six tests were averaged.

Melt flow rate was measured in a Ceast melt flow modular instrument at 220° C. with a 1.1 kg weight.

For compression set testing, ASTM D395-14 was used. Test specimens were conditioned to ambient lab temperature and humidity for 24 hours and then cut from 6 mm thick plaques using a punch style cutter with an inner diameter of 13 mm. Three samples of each plaque were loaded into a plate compression device with 4.5 mm spacer bars for constant deflection in accordance to test method B. Samples were then allowed to remain under constant ambient lab conditions or in a 70° C. oven for 22 hours. Thickness measurements were taken before compression and 30 minutes after a lab conditioning phase after being removed from the device. The calculated results are reported in accordance to ASTM 395-14.

Hardness testing was done in accordance with ASTM D2240-05. Samples were measured from the same 6 mm plaques used for compression testing, but only before compression samples were cut. A "type B" Shore A durometer was used along with a very dense lab bench as a base for testing. Measurements were collected and recorded in compliance with ASTM D2240-05.

Hardness testing was done in accordance with ASTM D2240-05. Samples were measured from the same 6 mm plaques used for compression testing, but only before compression samples were cut. A "type B" Shore A durometer was used along with a very dense lab bench as a base for testing. Measurements were collected and recorded in compliance with ASTM D2240-05.

Example 36 used Inventive resin Example 21 blended 80/20 with Kraton™ G1650. Example 21 resin resulted in Shore A hardness that was only increased moderately compared to the neat Kraton™ G1650, which is a desirable feature, while increasing modulus and tear strength. Unexpectedly, the Example 21 resin increased tear strength by 50% while it maintained compression set, reduced hardness, and increased the MFR by more than 160% over the higher molecular weight Endex™ 155. Test methods were the same as used in Example 35.

TABLE 6

Non-Vulcanized Thermoplastic Elastomer Binary Formulation Results

| | Example Number | | | | |
|---|---|---|---|---|---|
| | 35 | Comparison | Comparison Test Resin | 36 | Comparison |
| Formulation Test | Example 22 | Regalite ™ S7125 | no resin | Example 21 | Endex ™ 155 |
| Tear Strength-lbf/in | 287 | 211 | 142 | 372 | 247 |
| 50% modulus | 639 | 385 | 259 | 629 | 718 |
| 100% modulus | 658 | 367 | 311 | 644 | 695 |
| 200% modulus | 673 | 362 | 338 | 666 | 719 |
| 300% modulus | 727 | 376 | 364 | 721 | 355 |
| Tensile Strength@ break-Psi | 2698 | 2400 | 615 | 1452 | 1879 |
| % elongation | 3931 | 4020 | 2195 | 2522 | 2605 |
| Youngs modulus (ksi) | 5.14 | 3.8 | 0.75 | 0.39 | 0.49 |
| Shore A | 84 | 81 | 68 | 80 | 90 |
| Shore D | 25 | 22 | 15 | 30 | 35 |
| MFR 230° C./2.16 kg | 1.24 | 1.40 | <1 | 1.8 | 0.68 |
| Compression-RT | 43.3 | 55.8 | 41.7 | 31 | 31 |

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

What is claimed is:

1. An adhesive composition comprising:
   (a) at least one polymer; and
   (b) at least one polyindane resin having:
      (i) a mixed methylcyclohexane cloud point (MMAP) temperature of at least −20° C. and not more than 100° C.;
      (ii) a glass transition temperature (Tg) in the range of 10° C. to 120° C.; and
      (iii) a number average molecular weight (Mn) in the range of 300 g/mol to 5,000 g/mol.

2. The adhesive composition of claim 1, wherein the polyindane resin is partially or fully hydrogenated.

3. The adhesive composition of claim 1, wherein the polyindane resin has an MMAP temperature of at least −20° C. and not more than 70° C.

4. The adhesive composition of claim 1, wherein the polyindane resin has an MMAP temperature of at least 30° C. and not more than 100° C.

5. The adhesive composition of claim 1, wherein the polyindane resin has a Tg in the range of 50° C. to 90° C.

6. The adhesive composition of claim 1, wherein the polyindane resin has an Mn in the range of 400 to 1,000 g/mol.

7. The adhesive composition of claim 1, wherein the polyindane resin has a polydispersity (Mw/Mn) of 1.1 to 1.8.

8. The adhesive composition of claim 1, which comprises 5 to 70 weight percent of the polyindane resin.

9. The adhesive composition of claim 1, which comprises 10 to 60 weight percent of the polyindane resin.

10. The adhesive composition of claim 1, which comprises 35 to 70 weight percent of the polyindane resin.

11. The adhesive composition of claim 1, further comprising at least one oil or plasticizer; wherein the polymer is present in an amount from 30 to 300 parts based on 100 parts of the polyindane resin; and the oil or plasticizer is present in an amount from 40 to 300 parts based on 100 parts of the polyindane resin.

12. The adhesive composition of claim 1 further comprising at least one tackifier resin, at least one filler, and at least one oil or plasticizer; wherein the at least one polymer comprises an elastomer and a polyolefin polymer or copolymer, and wherein the adhesive composition comprises:
   (a) 50 to 500 parts of the elastomer;
   (b) 50 to 400 parts of the polyolefin polymer or copolymer;
   (c) up to 300 parts of the tackifier resin;
   (d) 40 to 500 parts of the oil or plasticizer; and
   (e) 50 to 500 parts of the filler,
all parts based on 100 parts of the polyindane resin.

13. The adhesive composition of claim 1, wherein the polymer is selected from the group consisting of an ethylene vinyl acetate copolymer, ethylene n-butyl acrylate copolymer, ethylene methyl acrylate copolymer, polyester, neoprene, urethane, poly(acrylate), ethylene acrylic acid copolymer, polyether ether ketone, polyamide, styrenic block copolymers, random styrenic copolymers, hydrogenated styrenic block copolymers, styrene butadiene copolymers, natural rubber, polyisoprene, polyisobutylene, atactic polypropylene, polyethylene, ethylene-propylene polymers, ethylene-butene polymers, ethylene-octene polymers, propylene-butene polymers, propylene-octene polymers, ethylene-propylene-butylene terpolymers, maleated polyolefins, butyl rubber, isoprene, terpolymers formed from ethylene, propylene, and a bicyclic olefin, isoprene-based block copolymers, butadiene-based block copolymers, ethylene vinyl acetate copolymer, acrylate copolymers, and polyvinyl acetate.

14. The adhesive composition of claim 1, wherein the polymer comprises an elastomer.

15. The adhesive composition of claim 14, wherein the elastomer is selected from the group consisting of block copolymers, thermoplastic/elastomer blends and alloys, metallocene-catalyzed polyolefin plastomers and elastomers, and reactor-made thermoplastic polyolefin elastomers;
   wherein said block copolymers are selected from the group consisting of styrenic block copolymer, copolyester block copolymer, polyurethane block copolymer, and polyamide block copolymer;
   wherein said styrenic block copolymer is selected from the group consisting of styrene-butadiene-styrene block copolymer, styrene-ethylene/butylene-styrene block copolymer, styrene-[ethylene-(ethylene/propylene)]-styrene block copolymer, and styrene-isoprene-styrene block copolymer; and
   wherein said thermoplastic/elastomer blends and alloys are thermoplastic polyolefins or thermoplastic vulcanizates.

16. The adhesive composition of claim 1, which further comprises at least one tackifier resin, at least one wax, at least one oil or plasticizer, at least one antioxidant, or combinations thereof.

17. The adhesive composition of claim 16, which is a hot melt adhesive.

18. The adhesive composition of claim 11, which has a viscosity at 177° C. in the range of 50 to 10,000 cP, and a ring and ball softening point in the range of 60° C. to 180° C.

19. An article comprising the composition of claim 1.

20. The article of claim 19, wherein said article is selected from the group consisting of roofing materials, water proofing membranes/compounds, underlayments, cable flooding/filling compounds, caulks and sealants, polymer compounds/blends, films, molded articles, rubber additive/processing aids, carpet backing, wire and cables, power and hand tools, pen grips, airbag covers, grips and handles, seals, and laminated articles.

* * * * *